United States Patent
Deshpande et al.

(10) Patent No.: US 6,381,362 B1
(45) Date of Patent: Apr. 30, 2002

(54) METHOD AND APPARATUS FOR INCLUDING VIRTUAL ADS IN VIDEO PRESENTATIONS

(75) Inventors: Sanjay Deshpande; Praful Naphade; C V K Rao, all of Pune (IN); Kamal Bhadada; Venkat Rangan, both of San Diego, CA (US)

(73) Assignee: Tata America International Corporation, New York, NY (US)

( * ) Notice: Subject to any disclaimer, the term of this patent is extended or adjusted under 35 U.S.C. 154(b) by 0 days.

(21) Appl. No.: 09/288,779

(22) Filed: Apr. 8, 1999

(51) Int. Cl.[7] ................................................ G06K 9/00
(52) U.S. Cl. ...................... 382/162; 348/584; 348/589
(58) Field of Search .............................. 382/100, 106, 382/107, 162, 165, 181, 232, 276, 282, 284; 348/61, 135, 143, 169, 578, 584, 586, 589, 598; 345/723; 725/32, 36

(56) References Cited

U.S. PATENT DOCUMENTS

| | | | | |
|---|---|---|---|---|
| 5,264,933 A | * | 11/1993 | Rosser et al. | 348/578 |
| 5,731,846 A | * | 3/1998 | Kreitman et al. | 348/581 |
| 5,808,695 A | * | 9/1998 | Rosser et al. | 348/584 |
| 6,100,925 A | * | 8/2000 | Rosser et al. | 348/584 |
| 6,184,937 B1 | * | 2/2001 | Williams et al. | 348/578 |

* cited by examiner

Primary Examiner—Bhavesh Mehta
(74) Attorney, Agent, or Firm—Donald R. Boys; Central Coast Patent Agency, Inc.

(57) ABSTRACT

A system for presenting a virtual advertisement or other virtual content in a sequences of frames of a video presentation utilizes data identifying a candidate region in the sequence of frames, a pixel signature for the region, the signature comprising a range of R, G, B values for pixels based on a standard deviation from an average value, and stored virtual content, such as an advertisement, to be implanted in the candidate region or regions. In operation, as frames having the candidate region are processed by an integration system, the alternative virtual content is substituted by default for the candidate region, except if a pixel value in the region falls outside the pixel signature range. The result is an ad that appears to be on a surface in the video presentation, as images that come between the ad and the viewer occlude the advertisement. Apparatus and methods for providing the video presentation and data sets for regions and advertisements are disclosed as well. Methods are provided for selecting candidate regions and for implanting virtual content in various embodiments.

15 Claims, 3 Drawing Sheets ically moving image entities, text blocks, or other graphics displays into selected frame-sequences of a video presentation before or as it is broadcast to an end user.
METHOD AND APPARATUS FOR INCLUDING VIRTUAL ADS IN VIDEO PRESENTATIONS

FIELD OF THE INVENTION

The present invention is in the field of video broadcasting, and pertains more particularly to methods and apparatus for implanting virtual ads into selected frame-sequences of a broadcast video presentation.

BACKGROUND OF THE INVENTION

The field of multimedia video advertising has undergone many recent improvements through technology known to the inventors that allows real-time computer-aided editing of digital video presentations. Methods, for example, have been developed for the purpose of inserting video overlays into selected video frames of an offered video. These overlays are used chiefly for the purpose of advertising, and the applications can implant images such as banner ads, independently moving image entities, text blocks, or other graphics displays into selected frame-sequences of a video presentation before or as it is broadcast to an end user.

A typical application for such inserted advertisements is inclusion in broadcast videos of sporting events. Because sporting events are often played at a stadium, a coliseum, or other type of predictable playing environment, information regarding the background of any video presentation covering an event at such locations may often be predictable and standardized. For example, a football game being played and recorded at a popular football stadium, wherein the camera positions are known or knowable, will have predictable regions in it's viewable background. Such regions include billboard spaces, walls of the arena, walls comprising the stands, scoreboards, areas of the field itself, and so on.

Semi-automated systems known to the inventors use the scheme described above, perhaps provided via access to a scale model of the location, and parameters of a video-camera system used to broadcast from the location, to compute the required information for implanting advertisements into the selected regions of a video. Advertisers then buy space in a video for insertion of their ads into the selected regions. Alternatively, one or more authoring stations may be used wherein authors may interact with real-time video feed to elect and designate regions useful for virtual ads.

The implanted ads are intended to appear to an end user watching the video presentation as if they are really in the stadium or game locale, such as on a fence or billboard, on a definable region of a playing field, on the side of a players dugout, and so forth. The ads described, because they are virtual ads, and may be selectively inserted, may also be selectively presented to selected audiences. Audiences viewing the same video broadcast in different geographic regions may then see different ads, advertising local businesses and products, and so on. In this way, advertising may be more flexible and local, at least, to a large viewing region.

The present inventors are aware of U.S. patents that allow ads to be inserted over fixed regions defined at a sporting event origination location.

For example, U.S. Pat. No. 5,264,933, issued to Inventors Roy J. Rosser et al. on Nov. 23, 1993 teaches apparatus and methods for inserting virtual content in video at an origination point, but no way to incorporate ads at a downstream point in a manner that lets moving images in the video presentation to occlude the virtual added content to make the virtual content appear more real.

Further, U.S. Pat. No. 5,543,856, issued Aug. 6, 1996 to the same inventors teaches an "electronic billboard" system which allows downstream insertion of virtual content, but in a way that does not allow moving images to occlude the virtual added content to provide a realistic depiction.

Finally, U.S. Pat. No. 5,731,846 issued to inventor Haim Kreitman on Nov. 24, 1998 teaches further apparatus and methods for implantation of virtual content, but does not teach a method for implanting virtual content by testing pixels in a primary video stream in a designated candidate region, and displaying broadcast or virtual alternative pixels in a manner to make the virtual content occludable by moving images in the primary stream. There is no teaching in these patents to any method or apparatus for rendering virtual ads that will appear as though they really exist on the infrastructure at the origination location, by allowing moving images in successive frames to occlude portions of the virtual ads.

What is clearly needed is a method and apparatus that allows virtual ads to be implemented at a user's premise in a manner such that the ads may be more selective, providing additional granularity in tailoring to selected audiences, and may be based on a variety of criteria, such as demographics. In addition, it is needed that such a system be capable of implementing ads such that they may also share the same frame-sequence and space as real-time images without visual conflict for end users. That is, the ads need to appear even more as though they are real phenomena on the areas they appear to occupy in the broadcast video presentation.

SUMMARY OF THE INVENTION

In a preferred embodiment of the present invention a system for providing virtual alternative display regions in video presentations is provided, comprising an apparatus providing a video presentation on a broadcast network; a video integration apparatus coupled to the network for receiving and processing the video presentation; at least one data set identifying a sequence of video frames in the video presentation, an individual region appearing in each of the frames in the sequence of frames, and a pixel signature comprising an average of red, green, and blue (R,G,B) values over all of the pixels in the individual region, the pixel signature also comprising a specific deviation from the RGB average values; and at least one alternative video region conforming in areal extent to the individual region in the video presentation, the alternative video region comprising alternative pixel values for the pixels in the individual region. The integration apparatus, as each frame of the video presentation is received and processed, tests the pixel values for the individual region in the frame, and for pixel values tested that deviate from the RGB average values beyond the specific deviation, displays the pixel values provided by the video presentation, and for pixel values tested that fall within the specific deviation from the average values, displays the alternative pixels from the stored alternative video region.

In a preferred embodiment the alternative video region comprises an advertisement, and the advertisement or other region may be transmitted to the video integration apparatus by the broadcast apparatus separately from the video presentation. Also in a preferred embodiment there may be plural data sets identifying plural individual regions in the video presentation and plural alternative regions, one alternative region associated with each individual region, wherein alternative pixel presentation is practiced for each individual region.

In another aspect a method for providing virtual alternative display regions in video presentations is provided, comprising steps of (a) providing a video presentation to a video integration apparatus; (b) sending a data set to the video integration apparatus, the data set identifying a sequence of video frames in the video presentation, an individual region appearing in each of the frames in the sequence of frames, and a pixel signature comprising an average of red, green, and blue (R,G,B) values over all of the pixels in the individual region, the pixel signature also comprising a specific deviation from the RGB average values; (c) providing an alternative video region conforming in areal extent to the individual region in the video presentation, the alternative video region comprising alternative pixel values for the pixels in the individual region; and (d) as each frame of the video presentation in the sequence of frames is received and processed, testing the pixel values for the individual region in the frame, and for pixel values tested that deviate from the RGB average values beyond the specific deviation, displaying the pixel values provided by the video presentation, and for pixel values tested that fall within the specific deviation from the average values, displaying the alternative pixels from the stored alternative video region.

In a preferred embodiment of this method, in step (c), the alternative video region comprises an advertisement, and the data set is transmitted to the video integration apparatus separately from the video presentation. There may also be plural data sets identifying plural individual regions in the video presentation and plural alternative regions, one alternative region associated with each individual region, wherein alternative pixel presentation is practiced for each individual region.

In another aspect of the invention a video integration system is provided, comprising apparatus for receiving a video data stream; at least one data set identifying a sequence of video frames in the video presentation, an individual region appearing in each of the frames in the sequence of frames, and a pixel signature comprising an average of red, green, and blue (R,G,B) values over all of the pixels in the individual region, the pixel signature also comprising a specific deviation from the RGB average values; and at least one alternative video region conforming in areal extent to the individual region in the video presentation, the alternative video region comprising alternative pixel values for the pixels in the individual region. The integration apparatus, as each frame of the video presentation is received and processed, tests the pixel values for the individual region in the frame, and for pixel values tested that deviate from the RGB average values beyond the specific deviation, displays the pixel values provided by the video presentation, and for pixel values tested that fall within the specific deviation from the average values, displays the alternative pixels from the stored alternative video region.

In this system, in a preferred embodiment, the alternative video region comprises an advertisement. The data set may be transmitted to the video integration apparatus separately from the video presentation. In this system as well there may be plural data sets identifying plural individual regions in the video presentation and plural alternative regions, one alternative region associated with each individual region, wherein alternative pixel presentation is practiced for each individual region.

In still another aspect of the invention a method for presenting an alternative video region in a sequence of frames in a video presentation is provided, comprising steps of (a) receiving a video data stream by a video integration apparatus; (b) identifying an individual region in a sequence of frames in the video presentation, and a pixel signature comprising an average of red, green, and blue (R,G,B) values over all of the pixels in the individual region, the pixel signature also comprising a specific deviation from the RGB average value; (c) identifying at least one alternative video region conforming in areal extent to the individual region in the sequence of frames of the video presentation, the alternative video region comprising alternative pixel values for the pixels in the individual region; (d) testing the pixel values for the individual region in the sequence of frames; (e) for pixel values tested that deviate from the RGB average values beyond the specific deviation, displaying the pixel values provided by the video presentation; and (f) for pixel values tested that fall within the specific deviation from the average values, displaying the alternative pixels from the stored alternative video region.

In this method, in step (c) the alternative video region may comprise an advertisement. There may also be plural data sets identifying plural individual regions in the video presentation and plural alternative regions, one alternative region associated with each individual region, wherein alternative pixel presentation is practiced for each individual region. Some or all of the alternative displays may be advertisements.

In yet another aspect of the invention a computerized system for editing a video presentation to provide an area for a virtual advertisement is provided, comprising input apparatus for selecting a region appearing in a sequence of frames in the video presentation; and a software routine for analyzing the selected region. The software routine prepares a pixel signature for the selected region by averaging the RGB values of pixels in the selected region and applying a deviation factor. In this system the deviation is computed as the standard deviation for the pixel values in the region. The region selected may be selected from a region library associated with a source of the video presentation.

In still another aspect a method for preparing a region in a sequence of frames in a video presentation for use as a region for added virtual content is provided, comprising steps of (a) taking an average of R, G, and B pixel values for pixels included in the region;(b) applying a deviation to the average values to provide a pixel value range for pixels in the region; (c) creating a data set identifying the region and associating the pixel signature with the region; and (d) providing the data set to an integration system for use in substituting virtual content.

The systems and methods of the invention provide, for the first time, an ability to provide virtual advertisements in video presentations, which are implanted at the client end, wherein the client end could be the end user or the cable operator or the ISP. This facilitates the implantation of virtual advertisements that cater to the local market and can be updated periodically. Moreover, the advertisements appear to be real, in the sense that moving images in the display that would be expected to overlay and occlude the advertisement actually do so.

BRIEF DESCRIPTION OF THE DRAWING FIGURES

DESCRIPTION OF THE PREFERRED EMBODIMENTS

It is an object of the present invention to provide a system and method including software for implanting unique virtual ads into video presentations. The ads implanted by techniques of the invention appear as real features in the displayed video, as they are displayed by a unique, selective technique that allows moving entities in the video to occlude the ads. The concept of occlusion, as used in this specification, defines a method wherein real-life images may cause interruption of a planned graphic overlay in those pixel groups involved with both images. That is, for example, given a virtual ad implanted according to techniques of this invention, appearing on an outfield fence of a baseball stadium, if a player moves in front of the fence, the ad will be occluded, and appear to be behind the player, just as it would if it were really applied to the fence. This leads to a more realistic visual effect from the point of view of a user watching an edited video presentation. The system, method, and apparatus of the present invention is described in enabling detail below.

Figure 1:
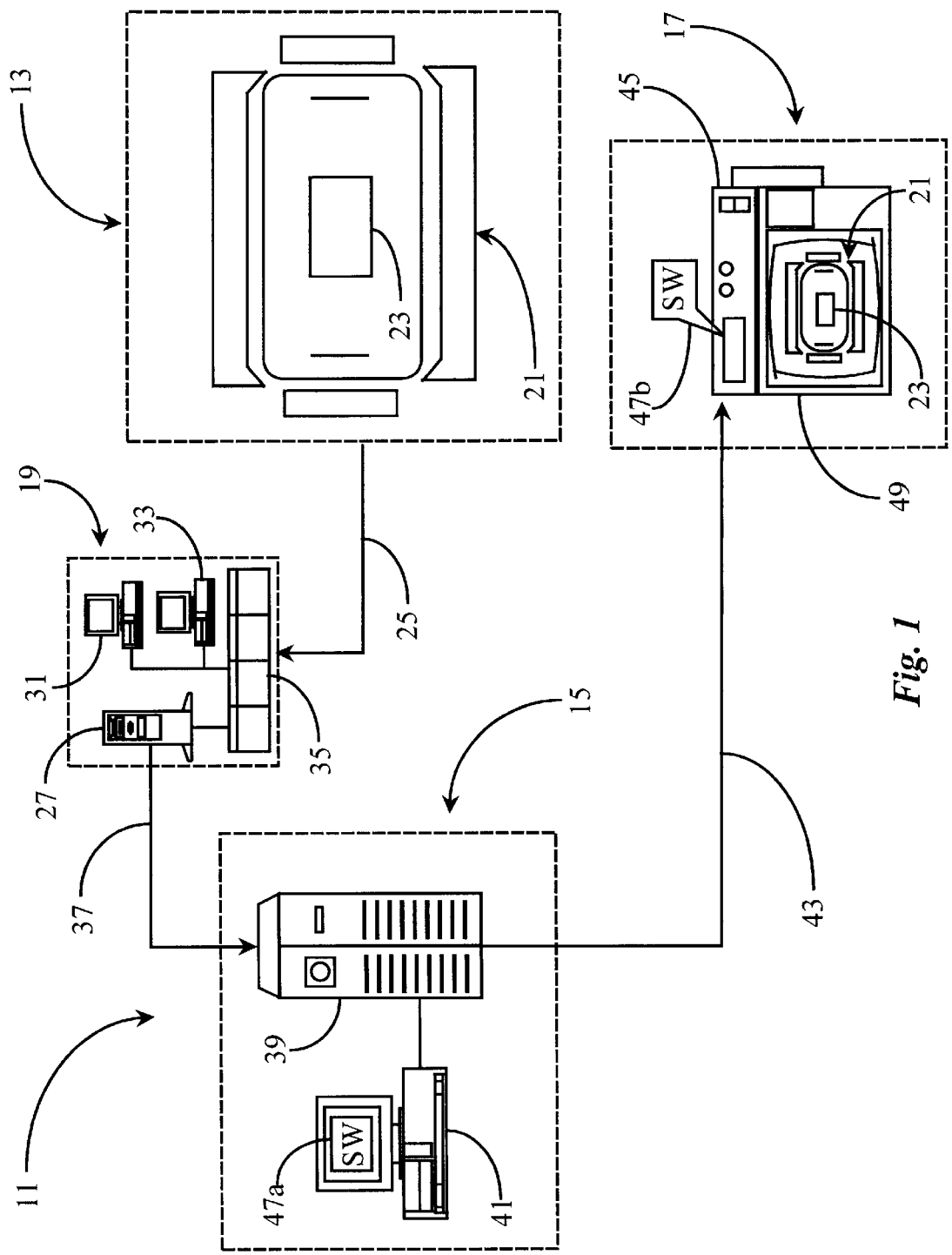
FIG. 1 is an overview of a video ad implanting system according to an embodiment of the present invention.

FIG. 1 is an overview of a video-image preparation, implanting, and viewing system 11 according to an embodiment of the present invention. System 11 comprises four basic and exemplary points or locations of activity. These are a video head-end 13 where cameras originally capture and feed an event, a broadcast and editing studio 19, an Internet Service Provider (ISP) 15, and an end-user premise 17.

Head-end location 13 is defined as any location where an event such as a sporting event or the like may be acquired and rendered as video for the purpose of broadcasting the event to an audience. Virtually any type of event and facility, whether indoors or outdoors, may be included in this category, and the invention is not limited to live broadcasts. Sources may also include video feed from any live or stored source. Broadcast studio 19 is an editing studio wherein video feeds are received and may be edited before being broadcast to an audience. Typically, such studios are now digitally equipped, at least in terms of video editing, although analog techniques may still be practiced in some broadcast studios. Studio 19 is not specifically required in order to practice the present invention, as there are apparatus and methods in the invention wherein ad locations may be automatically determined. In a preferred embodiment, however, editing stations, such as stations 31 and 33 are provided at Studio 19 in part for manual editors to identify and enable specific regions in a video cast for later insertion of virtual ads.

In a preferred embodiment of the present invention, ISP 15 is provided and adapted, in addition to typical ISP function, to receive, edit, store, and re-broadcast digital video presentations received from a broadcasting source such as broadcasting studio 19, either live or from storage. In practice of embodiments of the invention regions are specified in video presentations at or near source level, and definition of the regions selected is provided in or associated with the video stream, and rebroadcasters closer to end users are enabled to plant virtual content, such as advertisements in the defined locations. This arrangement allows ads to be inserted that are more locally relevant.

It will be apparent from the above that the example of an ISP for inserting virtual content in pre-defined regions is exemplary, as other local rebroadcasters may do the same, such as, for example, cable providers.

User premise 17 is defined as a location including customer premise equipment (CPE) wherein video from ISP 15 or another source may be viewed in it's most recently edited state.

ISP 15 in this example is capable of providing video presentations, video-editing information and created or supplied video-ads to an end user location for the purpose of ad implanting at the user location, which is premise 17 in this example. Virtual content may also be implanted in defined regions at ISP. In this example, location 13 comprises a football stadium 21, having an exemplary rectangular region 23. As is typical with sports stadiums, there are stands, player boxes, stadium walls, and other regions that are definable in terms of, location, and size. In one preferred embodiment of the present invention a texture parameter is also defined and used for such regions. The term texture as used by the inventor and included in this specification does not refer to a physical factor, such as roughness, as usually understood, but rather to an average color signature exhibited by a selected region. Rectangular region 23 represents just one such region of possibly many wherein virtual ads may later be placed. In this case, region 23 may comprise grass or artificial turf forming an identifiable texture of primarily shades of green.

To practice the invention it is necessary that candidate regions in a video presentation be identified for later use for insertion of virtual content such as ads. Moreover, the system for identification and the specification of the candidate region could be placed at studio 19 or the ISP. There are several methods incorporated in such a identification system, and three methods are described below.

Method 1: The size of region 23 is definable in terms of geometric parameters. In this case the region is rectangular and has a width and height. In a first method the location of region 23 may be pre-determined within a selected video frame or a sequence of video frames by applying known geometric relational-dimensioning and known camera-angle and camera-position parameters. Software at editing studio 19 or the ISP in this method, having access to a geometric model of stadium 13 and all camera parameters is used to prepare metadata expressing one or more regions for later implanting of virtual content. The location and size of each region is ultimately expressed in terms of pixel locations (X-Y coordinates) within each video frame as viewed on a display. Region 23, as seen by viewers watching a video, will be a location within a selected sequence of video frames to which a virtual ad will be implanted according to an embodiment of the present invention.

In this method at least one fixed position video camera either attended or unattended, records an event at location 13 and transmits a live video-feed to broadcast location 19 over a data-link 25. Data link 25 is intended to represent any type of functional link that may be established between a camera position and an editing studio including wireless satellite-link, wired digital or analog link, and so on. In most cases more than one fixed camera will be used to record an event as is well known and commonly practiced in the artMethod 2: In alternative embodiment and method, parameters relating to camera positions and functions are not used. Rather one or more authors at authoring stations (31, 33) at editing studio 19 identify regions for later implantation of virtual content. In this method software tools provided for the author enable the author, viewing the video presentation, to select candidate regions such as by dragging a box with pointer technique. In this method, once a region is defined, the software provided records the pixel values in the region as a signature map, and follows the signature map in subsequent frames extracting the coordinates of the extremities of the region such as the four corners for a rectangular region. The duration of the appearance of the region may be limited, either by input of the author or by default or other software technique.

Method 3: In this method, geometric parameters are input in special situations as a signature to identify a special characteristic of a region in a video presentation, to identify and qualify that region as a candidate for later insertion of virtual content. To illustrate, for a telecast of a soccer match it is known that nearly every soccer field has a center-circle with crossed lines. This geometric signature is input to a software application that searches each frame for the signature, and finding the input geometry the software identifies the region as a region for later substitution of virtual content. There may, of course, be more than one input candidate geometric signature in this method.

The three methods described above are not the only methods that may be used, and the methods are not mutually exclusive. Rather, the methods may be used exclusively or in any combination for identifying regions for later insertion of virtual content.

A number of regions in any instance may be identified for virtual content implantation. Such regions will preferably be blank or of one basic texture meaning that there are no painted ads already on the region that are viewable at the pixel coordinates of a region as seen on video. However, the method and apparatus of the present invention in some embodiments will also work for painted regions already containing ads. Having a relatively clean surface is merely a convenience for RGB averaging in obtaining a texture signature that may be used for more than one region. More detail regarding RGB averaging and image implanting is provided below.

Once a video is edited at studio 19, identifying regions for later implanting of virtual content, it may be, according to prior art systems, be broadcast via cable or any other suitable medium to an audience comprising a viewing region according to a schedule dictated by the studio. However, in this example of the present invention, a connection is established via an Internet link 37 from an upload server 27 within studio 19 to a server 39 within ISP 15. ISP 15 is where the actual video-image implant process of the present invention takes place in this example, although, in some embodiments implantation could also be done at studio 19 or at the user's premise 17. As also described above, ISP 15 is exemplary, and this function may be performed at any rebroadcast facility, such as at a cable provider's premise.

ISP 15, as previously described, has a server 39, which is adapted to deliver video to a user at user premise 17 via an Internet connection 43, among other functions. At least one computerized editing station 41 is provided and connected to server 39. An instance of editing software 47a is installed and executable on editing station 41. Software 47a comprises a digital software player and renderer filter adapted to display a video and extract bit-map (BMP) stills that represent individual frames of the video.

There are a variety of basic functions performed by software 47a. One of these is to recognize previously selected candidate regions for virtual content implantation previously recorded in metadata associated with received video streams. Another function is an ability to compute average RGB values for each candidate region by ascertaining the values for each pixel identified as specific to or included in a region, and, in a preferred embodiment, dividing the total values for each color by the number of included pixels. An RGB-deviation threshold is also developed for each region by taking the outside color values specific to two included pixels (low and high) for tolerancing purposes. Yet another function is to select and size virtual banner-ads to fit into specific regions. The functions of calculating and recording a digital signature for individual regions need not be limited to ISP 15 or an alternative rebroadcast site such as a cable provider. This may be done at studio 19 as well. The function of preparing virtual content and associating same with each region is preferably performed at ISP 15 or equivalent site close to the user's premises, because it is in this manner that virtual content may be best keyed to local users.

After all the required data is compiled and computed and video ads are selected for implant, software 47a is responsible for sending the data results along with selected ads to user's premise 17 where an instance of software 47b uses the information, along with possible other information, for ad insertion. Required data and ads for implant are transmitted to premise 17 over Internet connection 43, preferably ahead of an associated video presentation. In the case of a cable provider the content would of course be over the provider's cable(s) to the users.

User premise 17 comprises in this embodiment a television 49 or other video display apparatus and a set-top box 45 connected to television 49 as known in the art. Television 49 may, in some embodiments, be an interactive WEB-TV, a standard TV equipped with digital capability and Internet access capability, or even a personal computer adapted to receive and display video presentations. In the case of rebroadcaster 15 being a cable provider there will be able reception equipment at the user's premise. Set-top box 45 may be a cable box enhanced with Internet and digital capability as well as some computer capability such as memory and a means for executing software.

Software 47b is, in this example, installed in set-top box 45 and uses instructions and data received from software 47a. Software 47b comprises a digital software player and renderer filter as described for software 47a. There are a variety of basic functions performed by software 47b. These include a function for accepting and disseminating data input from software 47a; a function for computing average RGB characteristics of pixels identified in a specific region; a method for comparing computed results with stored data; and a mechanism for implanting virtual content into specific regions according to data results and system rules.

Software 47a at the content provider's end and software 47b at the user's end are integral parts of one interactive software suite developed to effect features of the present invention. In this particular embodiment, the software of the present invention is resident at ISP location 15 and user premise 17. However, this is not specifically required to practice the present invention. For example, both instances 47a and 47b may reside at station 41 as one application. In this case a completely edited video will be sent to user premise 17, including virtual ads already placed. Moreover, it is not required that ISP 15 be the last destination of video presentations before reaching user premise 17. For example, broadcast facilities may be in place to receive video from ISP 15 for broadcast to audiences over other mediums such as cable. In another embodiment, an ISP may not be used at all. In this case a broadcast studio such as studio 19 may be enhanced with the capabilities of the present invention. There are many possibilities as described above, and functions may be performed at interconnected locations in a cascading fashion.

The inventor's preference of using an ISP such as ISP 15 to deliver data and video content to end users is due to the fact that interactive capabilities associated with other video editing conventions (known to the inventor) may be provided. This includes sending WEB-based information requested through interaction with an offered video. Also, by maintaining an Internet connection, separate annotation streams associated with a video may be played alongside a video sourced from the WEB or another medium known to the inventor. Hence, the software of the present invention may include application interfaces for inter-working with other editing software programs known to the inventor.

Another advantage of utilizing an ISP such as ISP 15 is that ads may be tailored to a more local audience. This may be accomplished by compiling averaged user profiles from those user's subscribing to ISP 15 and receiving edited video presentations. In some embodiments, ads may be tailored also to specific users via user input to the system.

It will be apparent to one with skill in the art that there may be more than one computer editing-station such as station 41 connected to server 39 at ISP 15 without departing from the spirit and scope of the present invention. For example, there may be several such stations with each station responsible for covering a specific region appearing in a specific video sequence defined as selected a number of consecutive video frames.

It will also be apparent to one with skill in the art that a content provider other than an ISP may be provided and enhanced to practice the present invention without departing from the spirit and scope of the present invention. For example, instead of ISP 15, a cable provider or a specialized broadcast service may be used. In the case of a cable provider or other broadcast service, both instances of software 47a and 47b may be implemented as one application at the content provider's site with all video editing and implanting being performed there before broadcasting to end users such as one at user premise 17. However, if a suitable data link is established between end users and a content provider whereby digital data may be sent, then software 47a and 47b may be implemented as shown with respect to ISP 15 and user premise 17. More detail regarding software function will be provided below.

As described above it is an object of the invention to tailor virtual ads to local audiences or specific users. The virtual content to be added in the regions previously identified in a video presentation may be prepared in advance and stored at ISP 15 or equivalent. An author using station 41 may associate ads with pre-selected regions, or the association may be done in a number of different ways. In one embodiment, candidate regions are numbered as are ads to be implanted, and ads are called, sized, and implanted by number association.

When ads or other virtual content is added at ISP 15 or equivalent station, the ads are stored as pixel arrays, which are recalculated and sized to the regions to be used for the ads. In implantation the ad pixels are substituted for the primary video pixels in the candidate region.

Another phenomenon that must be dealt with is that a region identified for virtual content may at times be wholly within the boundaries of a frame, and at other times only partially so. For example, consider the previous example of center circle of a soccer field. As a camera follows play the center circle may at times be wholly within the boundaries of some frames, partially so in others (At the edge of the screen in display), and entirely missing on others. Software is provided to account for this phenomenon, such that the region signature, as described above, is tested for each frame. If a part of the signature is missing, that portion of the region, pixel-for-pixel, is also omitted from the virtual content for the region.

Figure 2:
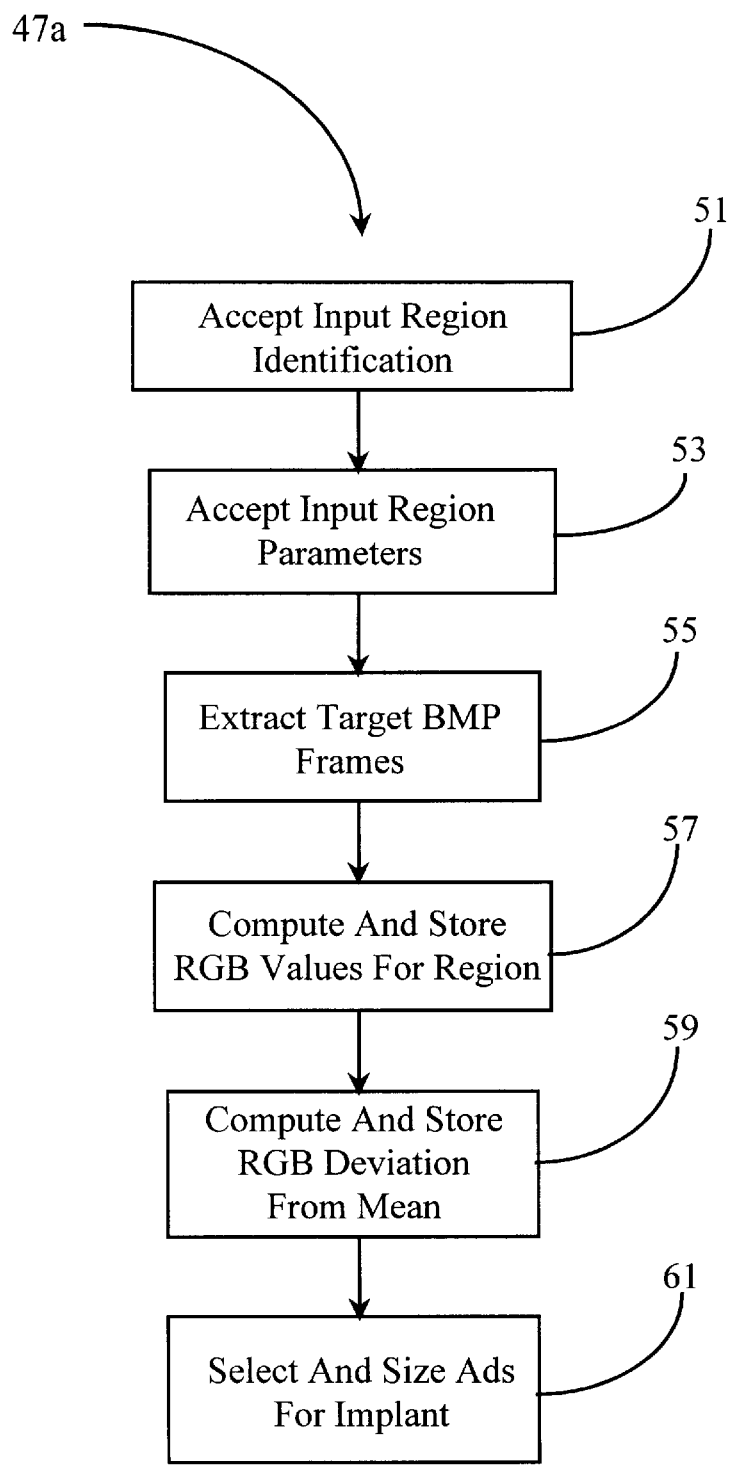
FIG. 2 is a process flowchart illustrating steps practiced at a provider location according to an embodiment of the present invention.

FIG. 2 is a process flowchart illustrating logical software steps executed by software component 47a as practiced at a provider location according to an embodiment of the present invention. Software instance 47a in this embodiment requires certain input information which must be supplied in order to successfully perform it's routines as previously described.

In step 51, component 47a accepts provided input data regarding region identification. Such information must be supplied from the field and may include a name for each type of region, the number of regions of each type targeted for ads, and any current ad status associated with any selected target regions. For example, there may be one or more identifiable regions on a playing field or court wherein virtual ads may be inserted. A basketball court, for example, has a center-court region enclosed in a painted circle, and two rectangular free-throw areas defined by a free-throw line that intersects two boundary lines bordered on the goal side by an end line. The free-throw areas (one at either end of the court) are painted one solid color, as is the center circle.

Using a basketball court as an example, data instruction for step 51 may include three selected regions targeted for ads. In this case, the names or numbers for each region will be different. If virtual ads are already present in the selected regions, then such information including identification of the sponsor of such ads may also provided. Permission to replace any existing overlay-ads inserted into the video by a studio such as studio 19 may be pre-negotiated. In some cases a studio such as studio 19 may delete or preclude insertion of such ads under agreement with ISP 15. In other cases, ISP 15, by virtue of having a unique audience wherein delivery of video is over the Internet, may reserve a right to selected regions in the video for ad insertion. There are many such possibilities.

In step 53 detailed parameters associated with each selected region are accepted. These parameters include but are not limited to dimensional size of a region such as width and height (rectangle), or diameter (circle). Location-data of each region is also provided to instance 47a in step 53. Location-data will consist of geometric location parameters for each region. It is preferred that regions selected for ad implanting have known characteristics such as consistent dimensional boundaries and locations from court to court or field to field. This would be the case with regulated geometric regions found on a field or court such as a basketball court and common to many sports. Such data is pre-known and may be included in software 47a without requiring input every time such a region is selected for ad implant.

At step 55, a renderer filter extracts selected BMP frames from a sequence of a video that is played via a digital player described as part of instance 47a. A selected sequence will contain a target region. Video sequences are marked by an editor operating at a station such as station 41 of FIG. 1 while viewing the video. Data obtained in steps 51 and 53 is utilized in step 55 to identify and locate a selected region in at least one of the selected BMP frames. This assumes that a sequence will contain a region at the same pixel coordinates over successive frames. In an embodiment wherein a camera is panning or following a moving object with a selected region in the background, pixel coordinates must be calculated for each frame of a sequence. Once a region is identified and correctly located in each BMP frame targeted for ad implanting, the process advances to step 57.

In step 57, a computation is made to determine the average RGB values for the sum of all pixels found within a selected region for each selected BMP frame. For example, if there are 4000 pixels in a selected region, then the RGB values of each pixel are summed for each color value and then divided by 4000 to obtain an average color signature for the region. This color signature is termed a texture by the inventor. Although the term texture is meant by the inventor to describe a basic solid color scheme such as grass, solid colored walls or billboards, sky, sections of hard courts, etc., it will be apparent to a skilled artisan that multi-colored surfaces may also be included in RGB averaging.

The purpose of RGB averaging as described above is to obtain a color signature for a specific region so that an occlusion effect as previously described and defined in this specification may be successfully implemented. After a texture is obtained for a specific region, it is classified and stored in a database for later reference. Such a database is termed a texture library by the inventor. A texture library may be a separate database accessible to both instances of software 47a and 47b. For example, artificial turf will have an average texture or color scheme that will vary only slightly from field to field. Such a texture may be stored and used for more than one video because of it's consistent color signature. In this way, an average RGB computation performed in step 57 for a signature (texture) need not be repeated every time a region is selected on artificial turf or another consistent texture. However, any time a new texture is to be identified, RGB averaging and tolerancing must be performed by software component 47a.

In many instances, there will be regions in which emblems are painted, billboards of varying colors, and other desirable regions where signatures do not remain consistent from field to field. Classification specific to each region which identifies, for example, the specific field, court or stadium that the region is indigenous to allows region signatures to be recalled from the texture library if the same region is going to be selected again. In this way, a unique region may be used again and again during broadcasts of different events without having to take a new RGB average for that region.

At step 59, a deviation from RGB average values computed in step 57 is ascertained for the purpose of applying a tolerance threshold for each region for later comparison. The reason for this step is that regions having a common texture from field to field may not necessarily have identical signatures. For example, a stadium having a playing field of natural grass or turf may have variances in actual shades. Moreover, color may change somewhat depending on the season. Therefore, a tolerance threshold is established for that type of texture and stored in the texture library. In this way, different regions may be selected on a specific type of background such as natural turf from field to field without requiring additional RGB averaging for turf at different locations.

In step 61, ads are selected and sized according to input and computed information from steps 51 through 55. Ads are either supplied by sponsors, or created at ISP 15 through the use of suitable known techniques. Technically, the ads are the same as overlay ads, meaning that the ad placed lays over (replaces) pixel values in a region. However, a unique method of breaking the ad down pixel by pixel is applied by rule in embodiments of the invention wherein individual pixels in a region may or may not carry it's portion of an ad. Hence, an image such as a moving player, ball, vehicle, or other real image may obstruct implementation of an ad at the pixel locations within a region that are temporarily occupied by the real image. Because this occurs in real time as a user watches a video, an implanted ad appears as if it is actually provided on the surface selected. For example, a virtual ad in a basketball court center circle will appear to be actually there, because as players move over the center circle the add will be occluded by the player, just as though the player were moving between the camera and the ad.

It will be apparent to one with skill in the at that an instance of software such as 47a may contain more or fewer steps of differing order than illustrated here without departing from the spirit and scope of the present invention. For example, steps 51 and 53 may be implemented as one step. Moreover additional steps may be created for different types of region classification such as one for common regions, and one for unique regions.

It will also be apparent to one with skill in the art that input data provided to component 47a may be provided in a variety of ways without departing from the spirit and scope of the present invention. For example, known information common to a specific type of region that has identical characteristics regardless of location may be provided to be part of the software without requiring input from the field.

After completing all of the required routines performed via component 47a, the data results and prepared ads are sent to a utilization site such as set top box 45 at user premise 17 of FIG. 1. Such data may be sent over a suitable Internet connection such as connection 43 of FIG. 1. Actual ad implanting may take place at ISP 15 or equivalent, with the resulting integrated digital video stream being sent to the user's premise 17 for display. In alternative embodiments ads are sent to the user's station, and software at the user's station accomplishes the implantation, occlusion effects, and the like.

Figure 3:
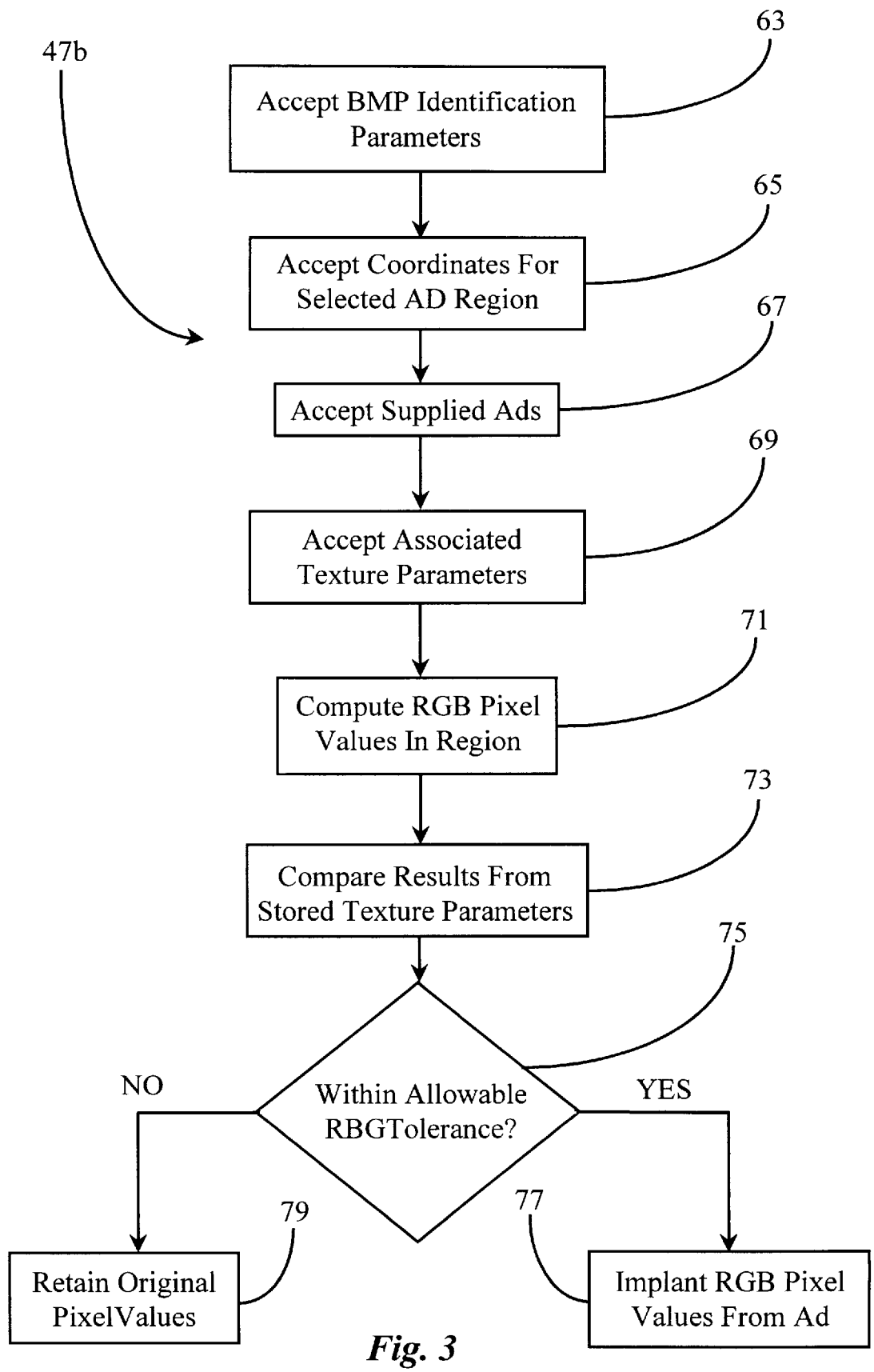
FIG. 3 is a process flowchart illustrating steps practiced at a user's premise according to an embodiment of the present invention.

FIG. 3 is a process flowchart illustrating logical software steps executed by component 47b as practiced at a user's premise such as premise 17 of FIG. 1, according to an embodiment of the present invention.

In step 63, BMP identification parameters are accepted. Such parameters are simply markers that alert a software sequence in component 47b to selected video sequences containing a region or regions for ad implantation. In step 65, the exact pixel coordinates for each region in each identified sequence are accepted. In step 67, supplied ads that have been identified to region and sequence are accepted and stored for implant. In step 69, texture parameters associated with various regions are accepted either from component 47a or from a database such as the previously described texture library.

In one embodiment the texture information is pushed to component 47a at step 69. In another embodiment component 69 may have independent access to the texture library and may request required data based on information received in steps 63–67.

As a video is presented, selected regions that appear in selected sequences are re-analyzed for average RGB characteristics in step 71. In step 73, the results are compared with an average RGB characteristic including tolerance-threshold data taken from stored texture parameters identified as generic to the current region being analyzed.

If during the analysis, it is decided by the system in step 75 that the current values are within the specified RGB tolerance for the average RGB characteristics for that region, then RGB pixel values from the planned ad are implanted in step 77. If however, it is decided at step 75 that a portion of pixels within a region do not fall within specifications of the RGB tolerance level as set forth in step 73, then original pixel values are retained for the portion of pixels that are non-compliant while the rest of the ad is implanted. This technique is governed by software rules and routine as described above, and produces the occlusion effect. Again, this function may be performed at the user's station or at some point earlier in the overall process.

Steps 71, 73, 75, 77, and 79 are ongoing steps occurring in sync as the video is played. The ads appear on the display of a user's viewing station such as television 49 of FIG. 1. If, for some reason, a current average RGB reading for a region as taken in step 71 is wholly not consistent with stored values for a specific texture of that region as entered in step 57 of FIG. 2, then an error alert may be signaled. If no real-life image has caused the variance, then it may be a sign that the real-life texture has been changed at that event location. In this case, an ad may still be implanted in the region, however, new texture data will have to be obtained via component 47a in order to reflect a new texture for that region.

It will be apparent to one with skill in the art that there may be more or fewer steps of differing order than is illustrated here without departing from the spirit and scope of the present invention. For example, steps 63–67 may be performed at one time. Steps 71–79 occur as part of a cycle during playing of a video. In one embodiment, additional routines may be included such as a previously described error routine wherein a mismatch on texture initiates an up-date system order. There are many such possibilities.

The method and apparatus of the present invention may be implemented in stand-alone fashion. That is to say that the software instances of 47a and 47b are not dependant on any other known video-editing applications. However, software 47a and 47b may also be integrated with other known video-editing routines including other video editing and authoring routines known to the inventor. For example, a system known to the inventor employs a technique for tracking moving objects on a screen by testing color signatures of pixels of the object in real time. This enables an editor to place an interactive region (hot spot) over the moving object such that by instruction, the hot spot moves along with the image. By integrating the software of the present invention with such object tracking software, an ad may be placed over a fixed object such as a region with the ad instructed to stick to (follow) the pixel coordinates of the region as determined through object tracking. In this way input data required from the field for determining size and location of a region may be greatly reduced.

It will further be apparent to one with skill in the art that the method and apparatus of the present invention may be implemented as a stand-alone program or as part of a larger editing program without departing from the spirit and scope of the present invention. Moreover, ads or other virtual content inserted may vary in one region within a single video. For example, in a football game, certain ads may be used in the first half, while the ads are changed or rotated to other ads during the second half with both first and second half ads occupying the same region. Moreover, the functions of defining candidate regions for implantation of virtual content may be implemented at various different locations in an overall network, and implantation of virtual content may be done also at various different locations after regions are defined. There are many alternate and variant possibilities, many of which have already been described above. Therefore the method and apparatus of the present invention should be afforded the broadest scope. The spirit and scope of the present invention is limited only by the claims that follow.

What is claimed is:

1. A system for providing virtual alternative display regions in video presentations, comprising:
   an apparatus providing a video presentation on a network;
   a video integration apparatus coupled to the network for receiving and processing the video presentation;
   at least one data set identifying a sequence of video frames in the video presentation, an individual region appearing in each of the frames in the sequence of frames, and a pixel signature comprising an average of red, green, and blue (R,G,B) values over all of the pixels in the individual region, the pixel signature also comprising a specific deviation from the RGB average values; and
   at least one alternative video region conforming in areal extent to the individual region in the video presentation, the alternative video region comprising alternative pixel values for the pixels in the individual region;
   characterized in that the integration apparatus, as each frame of the video presentation is received and processed, tests the pixel values for the individual region in the frame, and for pixel values tested that deviate from the RGB average values beyond the specific deviation, displays the pixel values provided by the video presentation, and for pixel values tested that fall within the specific deviation from the average values, displays the alternative pixels from the stored alternative video region.

2. The system of claim 1 wherein the alternative video region comprises an advertisement.

3. The system of claim 1 wherein the data set is transmitted to the video integration apparatus by the broadcast apparatus separately from the video presentation.

4. The system of claim 1 comprising plural data sets identifying plural individual regions in the video presentation and plural alternative regions, one alternative region associated with each individual region, wherein alternative pixel presentation is practiced for each individual region.

5. A method for providing virtual alternative display regions in video presentations, comprising steps of:
   (a) providing a video presentation to a video integration apparatus;
   (b) sending a data set to the video integration apparatus, the data set identifying a sequence of video frames in the video presentation, an individual region appearing in each of the frames in the sequence of frames, and a pixel signature comprising an average of red, green, and blue (R,G,B) values over all of the pixels in the individual region, the pixel signature also comprising a specific deviation from the RGB average values;
   (c) providing an alternative video region conforming in a real extent to the individual region in the video presentation, the alternative video region comprising alternative pixel values for the pixels in the individual region; and
   (d) as each frame of the video presentation in the sequence of frames is received and processed, testing the pixel values for the individual region in the frame, and for pixel values tested that deviate from the RGB average values beyond the specific deviation, displaying the pixel values provided by the video presentation, and for pixel values tested that fall within the specific deviation from the average values, displaying the alternative pixels from the stored alternative video region.

6. The method of claim 5 wherein, in step (c), the alternative video region comprises an advertisement.

7. The method of claim 5 wherein, in step (b) the data set is transmitted to the video integration apparatus separately from the video presentation.

8. The method of claim 5 comprising plural data sets identifying plural individual regions in the video presentation and plural alternative regions, one alternative region associated with each individual region, wherein alternative pixel presentation is practiced for each individual region.

9. A video integration system comprising:

apparatus for receiving and integrating a video data stream;

at least one data set identifying a sequence of video frames in the video presentation, an individual region appearing in each of the frames in the sequence of frames, and a pixel signature comprising an average of red, green, and blue (R,G,B) values over all of the pixels in the individual region, the pixel signature also comprising a specific deviation from the RGB average values; and at least one alternative video region conforming in areal extent to the individual region in the video presentation, the alternative video region comprising alternative pixel values for the pixels in the individual region;

characterized in that the integration apparatus, as each frame of the video presentation is received and processed, tests the pixel values for the individual region in the frame, and for pixel values tested that deviate from the RGB average values beyond the specific deviation, displays the pixel values provided by the video presentation, and for pixel values tested that fall within the specific deviation from the average values, displays the alternative pixels from the stored alternative video region.

10. The system of claim 9 wherein the alternative video region comprises an advertisement.

11. The system of claim 9 wherein the data set is transmitted to the video integration apparatus separately from the video presentation.

12. The system of claim 9 comprising plural data sets identifying plural individual regions in the video presentation and plural alternative regions, one alternative region associated with each individual region, wherein alternative pixel presentation is practiced for each individual region.

13. A method for presenting an alternative video region in a sequence of frames in a video presentation, comprising steps of:

(a) receiving a video data stream by a video integration apparatus;

(b) identifying an individual region in a sequence of frames in the video presentation, and a pixel signature comprising an average of red, green, and blue (R,G,B) values over all of the pixels in the individual region, the pixel signature also comprising a specific deviation from the RGB average value;

(c) identifying at least one alternative video region conforming in areal extent to the individual region in the sequence of frames of the video presentation, the alternative video region comprising alternative pixel values for the pixels in the individual region;

(d) testing the pixel values for the individual region in the sequence of frames;

(e) for pixel values tested that deviate from the RGB average values beyond the specific deviation, displaying the pixel values provided by the video presentation; and (f) for pixel values tested that fall within the specific deviation from the average values, displaying the alternative pixels from the stored alternative video region.

14. The method of claim 13 wherein, in step (c) the alternative video region comprises an advertisement.

15. The method of claim 13 comprising plural data sets identifying plural individual regions in the video presentation and plural alternative regions, one alternative region associated with each individual region, wherein alternative pixel presentation is practiced for each individual region.

* * * * *